US009294435B2

(12) United States Patent  (10) Patent No.: US 9,294,435 B2
Ivanov  (45) Date of Patent: Mar. 22, 2016

(54) METHOD OF AND SYSTEM FOR PROVIDING A CLIENT DEVICE WITH AN AUTOMATIC UPDATE OF AN IP ADDRESS ASSOCIATED WITH A DOMAIN NAME

(71) Applicant: YANDEX EUROPE AG, Lucerne (CH)

(72) Inventor: Vladimir Leontievich Ivanov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 14/698,946

(22) Filed: Apr. 29, 2015

(65) Prior Publication Data

US 2015/0237001 A1  Aug. 20, 2015

Related U.S. Application Data

(63) Continuation of application No. PCT/IB2014/061250, filed on May 6, 2014.

(30) Foreign Application Priority Data

May 13, 2013  (WO) ................ PCT/RU2013/000392

(51) Int. Cl.
*H04L 29/12*  (2006.01)
*H04L 29/08*  (2006.01)

(52) U.S. Cl.
CPC ............ *H04L 61/2007* (2013.01); *H04L 61/10* (2013.01); *H04L 67/10* (2013.01); *H04L 61/6068* (2013.01)

(58) Field of Classification Search
CPC ..... H04L 61/10; H04L 61/2007; H04L 67/10; H04L 61/6068
See application file for complete search history.

(56) References Cited

U.S. PATENT DOCUMENTS

| 2001/0044846 | A1 | 11/2001 | Cohn et al. |
| 2004/0073707 | A1 | 4/2004 | Dillon |
| 2009/0063704 | A1 | 3/2009 | Taylor |
| 2010/0069035 | A1 | 3/2010 | Johnson |

(Continued)

FOREIGN PATENT DOCUMENTS

EP  1838071 A1  9/2007

OTHER PUBLICATIONS

International Search Report from PCT/IB2014/061250; Jan. 22, 2015; Blaine R. Copenheaver.
Extended European Search Report for European patent application No. 14797443.0; dated Sep. 15, 2015.

(Continued)

*Primary Examiner* — Larry Donaghue
(74) *Attorney, Agent, or Firm* — BCF LLP

(57) ABSTRACT

Method of providing client device with automatic update of an IP address associated with domain name, comprising: If domain name is member of second set being subset of first set, obtaining by server from first domain name resolution service a first IP address. If domain name is member of third set being subset of second set, sending to client device first IP address. If domain name is member of second set, and if second IP address associated with domain name being different from first IP address is obtainable by server from second domain name resolution service, obtaining by server from second domain name resolution service second IP address. If domain name is member of third set, sending to client device second IP address without server having received from client device request for an IP address associated with domain name after server has sent to client device first IP address.

26 Claims, 9 Drawing Sheets

(56) References Cited

U.S. PATENT DOCUMENTS

| | | |
|---|---|---|
| 2011/0029599 A1 | 2/2011 | Pulleyn et al. |
| 2011/0035478 A1 | 2/2011 | Deutsch |
| 2011/0082931 A1* | 4/2011 | Wang ................ H04L 29/12066 709/224 |
| 2011/0138063 A1* | 6/2011 | Wu .................... H04L 29/12066 709/227 |
| 2012/0106548 A1* | 5/2012 | Bao ................... H04L 29/12028 370/390 |

OTHER PUBLICATIONS

Jang et al.; DNS Resolution with Renewal Using Piggyback, Journal of Communications and Networks, vol. 11, No. 4, pp. 416-427, Aug. 2009.

* cited by examiner

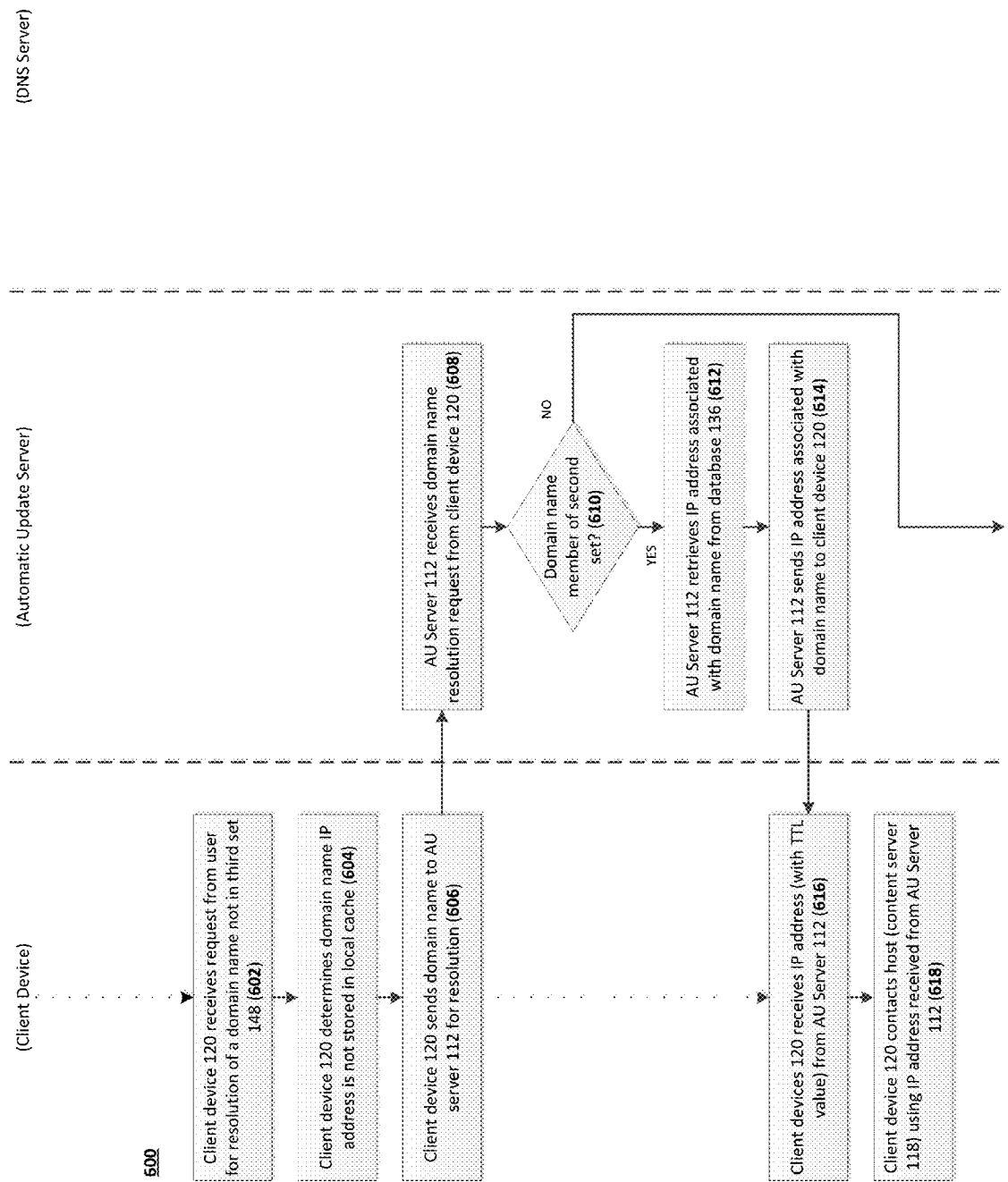

METHOD OF AND SYSTEM FOR PROVIDING A CLIENT DEVICE WITH AN AUTOMATIC UPDATE OF AN IP ADDRESS ASSOCIATED WITH A DOMAIN NAME

CROSS-REFERENCE

The present application claims convention priority to International Patent Application No. PCT/RU2013/000392, filed May 13, 2013, entitled "Method of and System For Providing a Client Device With an Automatic Update of an IP Address Associated with a Domain Name", which is incorporated by reference herein in its entirety. The present application is a continuation of International Patent Application No. PCT/IB2014/061250, filed May 6, 2014, entitled "Method of and System For Providing a Client Device With an Automatic Update of an IP Address Associated with a Domain Name", which is incorporated by reference herein in its entirety.

FIELD

The present invention relates to methods of and systems for providing a client device with an automatic update of at least one Internet Protocol (IP) address associated with a domain name.

BACKGROUND

Usage of digital communications networks such as the Internet continues to expand at a very rapid rate. One feature of the Internet that has led to its widespread adoption is its convenience in identifying destination hosts on the network. Computers generally address each other using numeric addresses that can be expressed in binary, hexadecimal, decimal or other numeric form. The well-known Internet Protocol (IP), for example, identifies computers communicating on a network by a unique address commonly expressed in human terms as four decimal numbers separated by periods in the case of version 4 of the protocol (IPv4), e.g. "151.207.247.130", or as eight hexadecimal numbers separated by colons in the case of version 6 of the protocol (IPv6), e.g. "2501:0db8:87a4:0000:0000:ba2e:0370:6214". These IP addresses, while useful to computers, are generally very difficult for most humans to remember.

As a result, the domain name system (DNS) has been developed and widely deployed to translate IP addresses used by computers to and from names that are more easily remembered by people. If a user operating a client device wishes to contact a particular host on the Internet identified by a particular fully qualified domain name (e.g. "www.yandex.com"), the client device contacts a DNS server on the network to request the IP address for that domain name (e.g. "100.43.87.3"). The client device can then use the IP address to contact the relevant host on the network. The process of translating a domain name into an IP address is known as domain name resolution. A detailed description of conventional DNS resolution is provided in a document entitled "*RFC 1035-Domain Names-Implementation and Specification*", by P. Mockapetris, November 1987, the entirety of which is hereby incorporated by reference herein in those jurisdictions allowing for incorporation by reference.

Conventional domain name resolution technology requires that, in order to resolve a domain name, a client device send a request (directly or indirectly) to a DNS server for the IP address associated with a domain name. The domain name server responds to a client device's request with the IP address, as well as with a parameter indicating for how long the information being provided (e.g. the IP address) is to be considered valid. This is because domain names can (and often do) change IP addresses with which they are associated. This "freshness" parameter is typically referred to as a "time-to-live" or "TTL" value. After a first request for resolution of a domain name, should a client device again need the IP address of a domain name at a time within the TTL value of the client device's last having been provided with this information, no second request is required; the client device will simply use the IP address already having been provided to it. If however the TTL value has been exceeded, the client device will consider the information it had previously received stale, and will make another request to a DNS server for resolution of the domain name.

Because domain name resolution is today performed very frequently, even small improvements in its efficiency can, for example, have a significant beneficial cumulative effect.

In some network configurations, the particular properties of the network link between a client device and a domain name server are such that conventional domain name resolution operates more slowly than desirable. For example, if a client device is connected to a domain name server via a high-latency link such as a satellite communications link, the time necessary to receive a response to domain name resolution queries initiated by the client device can be significant, and such delay can be frustrating to the end user. As an improvement in this area, U.S. Pat. No. 8,285,870, issued Oct. 9, 2012 to Taylor et al., entitled "Systems and Methods for Statistical Resolution of Domain Name Service (DNS) Requests", discloses (according to its abstract): "Systems and methods . . . for resolving domain name services (DNS) queries for address information about hosts on a network. The queries are posited from remote users across a satellite or other remote link to a network, and are monitored as they pass through a central node logically present between the remote link and the network. A list of statistically significant hosts on the network is maintained and transmitted from the central node to the plurality of remote users across the remote link. By providing the remote nodes with a current list of popular hosts and associated address information, subsequent domain name services queries placed for the statistically significant hosts may be resolved without communicating across the remote link."

While the systems and methods disclosed in Taylor may be adequate, further improvement in DNS technology may be desirable.

SUMMARY

It is thus an object of the present technology to provide an improvement to conventional DNS technology.

The present technology results, at least in part, from a recognition that: (1) in at least some instances current DNS resolution technology may be inefficient; (2) not all domain names are requested to be resolved with the same frequency (there is a variance between the frequencies with which domain names are requested to be resolved); (3) domain names may change IP addresses with which they are associated, and that, with varying frequencies.

In accordance with the present technology domain names (of a domain name space) are notionally divided into (at least) three different groups, generally termed "sets" in the present specification.

The first set of domain names is a subset (generally, although not always, a proper subset) of the entirety of domain names existing in a domain name space (e.g. the entire Internet).

The second set is a subset of the first set and thus includes certain domain names that are members of the first set. (The second set is generally, although not always, a proper subset of the first set.) For domain names that are members of the second set, a server employing the present technology automatically resolves and stores the IP address(es) associated with such domain names in a database in communication with the server. Thus, the server does not wait for a particular request for resolution one of these domain names from a client device, rather the server retrieves IP addresses for these domain names (at least at times) without having received a particular immediate request from a client device to do so, and stores such IP addresses. Further, (at least) once an IP address (associated with a domain name of the second set) that the server has retrieved goes stale, the server will again resolve the domain name and store the (new) IP address(es) in the database. In this manner the server generally maintains up-to-date IP addresses for the domain names of the second set.

The third set is a subset of the second set and thus includes certain domain names that are members of the second set. (The third set is generally, although not always, a proper subset of the second set.) For domain names that are members of the third set, not only does a server employing the present technology automatically resolve, store, and update the IP addresses of such domain names in a database in communication with the server, but those IP addresses (including updates to those IP addresses) are automatically sent to client devices employing the present technology in communication with the server. Thus, a server does not wait for a particular request for resolution one of these domain names from a client device to send to the client device IP addresses for domain names being members of the third set, rather the server sends IP addresses (including updated IP addresses) for these domain names (at least at times) without having received a particular immediate request from a client device to do so. Therefore, client devices employing the present technology in communication with server(s) employing the present technology generally have locally up-to-date IP addresses for domain names being members of the third set. When such a client device requires resolution of one of the domain names of the third set, the client device simply retrieves an IP address already locally stored on the client device.

Returning to the second set, in different implementations, there are different uses for the second set. In some implementations, the sole use for the domain names of the second set is to serve as a reservoir for domain names includable in the third set. In such implementations, if a domain name is included in the second set, but is not included in the third set (generally or in respect of a particular client—as the case may be), no use is made of IP address stored on the server should a client device require resolution of such a domain name. In other implementations, however, when a client device in communication which such a server requires resolution of one of the domain names of the second set that is not a member of the third set, communication with a DNS server is not necessary as the server is already storing at least one up-to-date IP address associated with that domain name. In this situation, the server simply provides a stored IP address for that domain name to the client device.

In the present specification, the present technology is described in terms of grouping domain names into three sets. It is recognised, however, that grouping domain names into greater numbers of sets is possible. In one simple non-limiting example, such would be the case in a system where two different servers having the present technology were employed, each of the servers maintaining different sets of groups of domain names up-to-date. The use of the three set description in the present specification is thus intended to be illustrative and not limiting.

In one aspect, some implementations of the present technology provide a method of providing a client device with an automatic update of at least one IP address associated with a domain name, by at least one server via a communications network, the method comprising:

(a) if the domain name is a member of a second set of domain names, the second set being a subset of a first set of domain names,
  (i) obtaining by the at least one server from a first domain name resolution service at least one first IP address associated with the domain name, and
  (ii) storing by the at least one server in a database in communication with the at least one server at least one address record including the domain name and the at least one first IP address;
(b) if the domain name is a member of a third set of domain names, the third set being a subset of the second set of domain names, sending to the client device by the at least one server the at least one first IP address;
(c) if the domain name is a member of the second set of domain names, and if at least one second IP address associated with the domain name being different from the at least one first IP address is obtainable by the at least one server from a second domain name resolution service after the at least one server has obtained the at least one first IP address,
  (iii) obtaining by the at least one server from the second domain name resolution service the at least one second IP address, and
  (iv) storing by the at least one server in the database an address record including the domain name and the at least one second IP address; and
(d) if the domain name is a member of the third set of domain names, sending by the at least one server to the client device the at least one second IP address without the at least one server having received from the client device a request for at least one IP address associated with the domain name after the at least one server has sent to the client device the at least one first IP address.

In another aspect, some implementations of the present technology provide a system for providing a client device with an automatic update of at least one IP address associated with a domain name, by at least one server via a communications network, the system comprising:

(a) a first domain name information retrieval component that effects, if the domain name is a member of a second set of domain names, the second set being a subset of a first set of domain names,
  (i) obtaining by the at least one server from a first domain name resolution service of at least one first IP address associated with the domain name, and
  (ii) storing by the at least one server in a database in communication with the at least one server of at least one address record including the domain name and the at least one first IP address;
(b) a first domain name information dispatch component that effects, if the domain name is a member of a third set of domain names, the third set being a subset of the second set of domain names, sending to the client device by the at least one server of the at least one first IP address;
(c) a second domain name information retrieval component that effects, if the domain name is a member of the second set of domain names, and if at least one second IP address associated with the domain name being different from the at least one first IP address is obtainable by the at least one server from a second domain name resolution service after the at least one server has obtained the at least one first IP address,
  (iii) obtaining by the at least one server from the second domain name resolution service of the at least one second IP address, and
  (iv) storing by the at least one server in the database of an address record including the domain name and the at least one second IP address; and
(d) a second domain name information dispatch component that effects, if the domain name is a member of the third set of domain names, sending by the at least one server to the client device of the at least one second IP address without the at least one server having received from the client device a request for at least one IP address associated with the domain name after the at least one server has sent to the client device the at least one first IP address.

In another aspect, some implementations of the present technology provide a computer usable information storage medium having computer readable program code embodied thereon for providing a client device with an automatic update of at least one IP address associated with a domain name, by at least one server via a communications network, the computer readable program code including instructions that when executed by a computer effect:
(a) if the domain name is a member of a second set of domain names, the second set being a subset of a first set of domain names,
  (i) obtaining by the at least one server from a first domain name resolution service of at least one first IP address associated with the domain name, and
  (ii) storing by the at least one server in a database in communication with the at least one server of at least one address record including the domain name and the at least one first IP address;
(b) if the domain name is a member of a third set of domain names, the third set being a subset of the second set of domain names, sending to the client device by the at least one server of the at least one first IP address;
(c) if the domain name is a member of the second set of domain names, and if at least one second IP address associated with the domain name being different from the at least one first IP address is obtainable by the at least one server from a second domain name resolution service after the at least one server has obtained the at least one first IP address,
  (iii) obtaining by the at least one server from the second domain name resolution service of the at least one second IP address, and
  (iv) storing by the at least one server in the database of an address record including the domain name and the at least one second IP address; and
(d) if the domain name is a member of the third set of domain names, sending by the at least one server to the client device of the at least one second IP address without the at least one server having received from the client device a request for at least one IP address associated with the domain name after the at least one server has sent to the client device the at least one first IP address.

In summary, when resolution of a domain name is required, in system employing the present technology, an IP address may be retrieved from a client device itself (if it is stored on the client device), from a server (if it is not stored on the client device but it is stored on the server—and this functionality has been implemented), or via a domain name server (if it is not stored on the server—or if that functionality has not been implemented). In some instances then, via the use of the present technology, the resolution of a particular domain name may occur faster than would have been the case had the present technology not have been employed, as various communication and/or processing steps may be avoided, depending on the domain name, and the particular implementation of the present technology.

Other than respecting the subset relationships between them that are described above, the "first set", the "second set", and the "third set" of the present technology do not need to be defined in any particular manner. One likely objective in defining the sets of the present technology, in at least some implementations, will be the "efficient" processing of domain name resolution requests. In this respect, for example, the sets may be so defined such that IP addresses for a group of domain names most likely to be requested to be resolved (however in a particular implementation this is defined) reside locally on a client device, IP addresses for a group of those domain names next most likely to be requested to be resolved (however in a particular implementation this is defined) reside on a server employing the present technology, and IP address for those domain names not being members of another group are left to be resolved via a standard DNS resolution request to a DNS server. It should be understood however, that while it is foreseen that in some implementations the sets may be defined so as to more efficiently process domain name resolutions (as compared with a system not employing the present technology), not every implementation of the present technology will have that objective. The sets of the present technology may be defined with respect to one (or more) of any number of possible objectives, or even with no particular objective at all. The present technology requires no particular set design objective.

Nevertheless, given the sheer number of domain names in existence today and the frequency with which many of them change, it likely would be an inefficient use of network resources to send automatic updates of IP addresses in respect of all domain names to all client devices irrespective of the likelihood of those domain names being of interest to users of those client devices. Thus, in many cases the aforementioned sets of domain names may be constructed based on estimated frequency of requests for resolution of domain names. In this respect, other than in special circumstances, it is generally optimal neither to require client devices to request IP addresses via a network link in respect of all domain names, nor to send all IP addresses in respect of all domain names to all client devices. In some implementations, the present technology seeks to carve out a middle ground by allowing for IP addresses in respect of a limited set of domain names to be kept up to date on a server and a further subset to be sent to one or more client devices. A variety of factors may be taken into account when defining, first, the set of candidate domain names in respect of which associated IP addresses could be kept up to date on the server (i.e. members of the first set), second, the set of domain names in respect of which associated IP addresses are actually kept up to date on the server at any given time (i.e.

members of the second set), and third, the set of domain names in respect of which associated IP addresses are sent to one or more client devices (i.e. members of the third set). As is discussed in further detail below, the selection of domain names in respect of which IP addresses are to be kept up to date on a server (i.e. which are members of the second set) as well as the further selection of domain names in respect of which IP addresses are to be sent to a client device (i.e. which are members of the third set) are made on the basis of various types of information, collected from a variety of sources, depending on the particular implementation of the technology.

In some implementations, the first set is defined to include all domain names in a domain name space in respect of which resolution can be reasonably foreseen to be requested in a given set of circumstances. Thus, for instance, it is extremely unlikely that resolution of a domain name in respect of a restaurant having a single location in Ulan Bator, Mongolia will be requested by a client device located in Buenos Aires, Argentina. Such a domain name would not in this example be included in a first set with respect to a system employing the present technology operating solely in respect of Argentina. In such an instance, were such a domain name resolution request made, not only will a standard DNS request be required, but it will likely be required of a DNS server not generally utilized for such requests coming from Argentina. (As a person of ordinary skill in the art would understand, the entire domain name space of the Internet is too large for a single non-root DNS server to handle, so a typical DNS server is only able to resolve some of the total domain names in use on the Internet. A DNS server may redirect DNS requests that it is incapable of handling to another DNS server).

As was discussed hereinabove, the second set includes domain names in respect of which a server employing the present technology attempts to store up-to-date IP addresses in a database with which the server is in communication.

As was discussed hereinabove, the third set includes domain names in respect of which a server employing the present technology attempts to provide a client device employing the present technology with up-to-date IP addresses.

In most implementations, the definition of the first set and the second set are at the server level (and are thus the same for all clients in communication with (and being managed by—with respect to the present technology) that server). The definition of the third set may be either at the server level (and would thus be the same for all clients in communication with (and being managed by—with respect to the present technology) a particular server) or at the client device level (and thus could vary with respect to different client devices in communication with (and being managed by—with respect to the present technology) that a particular server).

In various implementations, the definitions of the first set, the second set, and the third set could be statically determined in advance, dynamically modified over time, or a combination of static and dynamic. No particular condition is required in this regard (as long as the subset relationships between the sets described hereinabove is respected). For example, in one non-limiting implementation, the definition of the first set and the second set could be static and the definition of the third set could be dynamic (although the third set must remain a subset of the second set).

In some implementations, at least one of the first set of domain names, the second set of domain names, and the third set of domain names is defined, at least in part, based on a popularity of network resources. Thus, for example, in a set design scheme including this particular element amongst its features, at least one of the sets may be defined so as to include the X number of most frequently visited web servers on the Internet or the Y number of domain names for which domain name resolution requests are most frequently received (for example, whether by a particular DNS server or by a particular plurality of DNS servers).

In some implementations, at least one of the first set of domain names, the second set of domain names, and the third set of domain names is defined, at least in part, based on geography. Thus, for example, in a set design scheme including this particular element amongst its features, various geographical considerations could influence the set definition(s), such as, for example, the location of network resources associated with domain names and/or the location of a client device. Moreover, geographical considerations could, for example, be combined with popularity considerations, such that at least one of the sets could be defined, for example, as including the domain names most popular in a particular country or other geographical region. A reverse combination may likewise be envisaged; for example, from the domain names associated with popular network resources, only those also associated with a particular geographical region could be selected for inclusion in a particular set.

In some implementations, at least one of the first set of domain names, the second set of domain names, and the third set of domain names is defined, at least in part, based on language. Thus, for example, in a set design scheme including this particular element amongst its features, linguistic considerations may include, as non-limiting examples, the language of any text content located on network resources associated with a domain name, the language settings of an application running on a client device, or the language settings of the client device's operating system. Moreover, as above, linguistic considerations could be combined with other considerations (for example, the one hundred most popular Spanish-language websites in Texas).

In some implementations, at least one of the first set of domain names, the second set of domain names, and the third set of domain names is defined, at least in part, based on domain name hierarchy. Thus, for example, in a set design scheme including this particular element amongst its features, a set could be limited to those domain names within the ".com" top-level domain or to those within a lower-level hierarchy, such as ".qc.ca" or ".yandex.ru". Again, as above, domain name hierarchy considerations could be combined with other considerations.

In some implementations, at least one of the first set of domain names, the second set of domain names and the third set of domain names is defined, at least in part, based on search engine statistical information. Thus, for example, in a set design scheme including this particular element amongst its features, the definition of a set could be arrived at using statistic information garnered from a search engine (e.g. Yandex™, Google™, etc.) In some such implementations, for example, statistical information collected by a search engine could be taken into account to determine domain names in respect of which one or more clients are likely to request domain name resolution. In other such implementations, for example, search engine statistical information could relate to aggregate search histories, such as the number of times each of a plurality of domain names has appeared in search results provided to all of the users of the search engine over a particular time frame. In other such implementations, for example, search engine statistical information specific to a particular client device or user, such as the search history of the user or users of the client device, could be used. In other such implementations, for example, search engine statistical information could be used to identify groups of domain names along a particular theme (e.g., websites about cars or a particular type of car). Again, as above, these considerations could be combined with other considerations.

In some implementations, at least one of the second set of domain names and the third set of domain names is defined, at least in part, based on freshness parameters. As was referred to hereinabove, in a conventional DNS response providing an IP address associated with a domain name, a time-to-live (TTL) value indicating the number of seconds for which the IP address should be considered valid is included. In a set design scheme including this particular element amongst its features, for example, the definition of set(s) could make use of TTL values obtained from domain name resolution services or analogous freshness parameter values. Again, as above, these considerations could be combined with other considerations.

In some implementations, at least one of the second set of domain names and the third set of domain names is defined, at least in part, using a freshness parameter predetermined (minimum or maximum) threshold value. Thus, in a set design scheme including this particular element amongst its features, for example, IP addresses with an associated TTL value and/or other freshness parameter value (e.g. time between IP address changes for a given domain name) which is lower (or higher—depending on how the freshness parameter is defined) than the threshold value—indicating that the IP address is prone to changing frequently—might be either not kept up to date on the server (i.e. not be included in the second set) or might not be sent to client devices (i.e. not be included in the third set), thereby reducing the volume of domain name resolution data being manipulated, sent and/or received. In such a case, for example, instead of receiving each new IP address in respect of a domain name whose IP address's associated TTL value is below a threshold automatically, a client device would have to obtain the IP address for the domain name by sending a conventional DNS request. Again, as above, these considerations could be combined with other considerations.

In some implementations, at least one of the second set of domain names and the third set of domain names is defined, at least in part, based on demographic information. Thus, in a set design scheme incorporating this particular element amongst its features, for example, the popularity of network resources among women, teenagers, or a particular ethnic community could be used to define (at least in part) one or more of the sets of domain names. In another example, demographic information about the particular user or users of a client device could also be used in the definition of the sets. Again, as above, these considerations could be combined with other considerations.

In some implementations, at least one of the second set of domain names and the third set of domain names is defined, at least in part, based on estimated uses of IP addresses. Thus, in a set design scheme incorporating this particular element amongst its features, estimated uses could include, for example, the type of application (e.g. web browser, email client, social networking application, peer-to-peer file sharing client) that is expected to use an IP address. Again, as above, these considerations could be combined with other considerations.

In some implementations, at least one of the second set of domain names and the third set of domain names is defined, at least in part, based on information having been received from the client device. In a set design scheme incorporating this particular element amongst its features, for example such information could include any kind or nature of information. As a non-limiting example, in some implementations, at least one of the second set of domain names and the third set of domain names is defined, at least in part, based on properties of the client device. Thus, in a set design scheme incorporating this particular element amongst its features, the definition of one (or more) set(s) of domain names could vary depending on factors such as the processing power of a client device, whether a client device is a desktop computer or a mobile device, or an operating system a client device is running. As another non-limiting example, in some implementations, at least one of the second set of domain names and the third set of domain names is defined, at least in part, based on historical usage of the client device. Thus, in a set design scheme incorporating this element amongst its features, for example, a web-browsing history associated with a client device could provide an indication of the domain names in respect of which that client device is likely to request domain name resolution, and therefore be used in the definition of the second set and/or the third set. Again, as above, these considerations could be combined with other considerations.

In some implementations, at least one of the second set of domain names and the third set of domain names is defined, at least in part, based on properties of the communications network. Thus, in a set design scheme incorporating this particular element amongst its features, for example, if a client device is connected to a server (incorporating the present technology) via a low-bandwidth link, it may be appropriate to reduce the number of domain names in respect of which automatic updates of IP addresses are sent to that device (i.e. are members of the third set). While in the case of a high-latency link, for example, the lag time of conventional DNS relative to local domain name resolution on the client device may justify an increase in the number of domain names in respect of which automatic updates of IP addresses are sent to the client (i.e. are members of the third set). Again, as above, these considerations could be combined with other considerations.

In some implementations, the third set of domain names is defined, at least in part, based on a specific request of the client device. Thus, in a set design scheme incorporating this particular element amongst its features, for example, a client device could specifically request to be sent to be sent automatic updates of IP addresses in respect of one or more domain names, and therefore force certain domain names to be included in the third set of domain names (and thereby force those domain names to be included in the first set and/or second set were they not otherwise already included therein). Similarly, a client device could specifically request not to be sent automatic updates of IP addresses in respect of one or more domain names, and therefore force certain domain names to be excluded from the third set of domain names. In some of such implementations, the at least one server might always comply with such requests from a client device. In other implementations, this might not be the case; such a request from a client device could influence (but not control) the definition of the third set, or such a request could be ignored by a server altogether. Again, as above, these considerations could be combined with other considerations.

In some implementations of the above aspects, the third set of domain names is defined, at least in part, based on a user profile. As an example, a user of a client device could be logged into a service in respect of which the user has a user profile. An example may be one of the services offered by Yandex™, Google™, or Yahoo™. Again, as above, these considerations could be combined with other considerations. In some implementations, the first domain name resolution service and the second domain name resolution service are a same domain name resolution service. In this respect, the present technology does not require, nor does it forbid, that the first domain name resolution service and that the second domain name resolution service be different domain name resolution services. Depending on the implementation, they may be the same domain name resolution service, or they may be different domain name resolution services.

In some implementations, at least one of the first domain name resolution service and the second domain name resolution service is a process running on the at least one server. In this respect, the present technology does not require that a "server" of the present technology be separate from a conventional DNS server. A server of the present technology may, for example, depending on the implementation, be a virtual machine running on the same hardware as a conventional DNS server. A server of the present technology may also, for example, depending on the implementation, be a software component of a conventional DNS server. A server of the present technology being separate software and hardware from a conventional DNS server is envisaged as well, and thus, in some implementations, at least one of the first domain name resolution service and the second domain name resolution service is in communication with the at least one server via the communications network.

As was discussed hereinabove, various actions (e.g. the updating of IP addresses for domain names in the second set by the server, the sending of updated IP addresses to a client device for domain names in the third set by the server) as described as being "automatic". In the context of the present specification, "automatic" should be understood as the server not having to wait for a particular request for resolution of a domain name to carry out the action in question. However, it should also be understood, that "automatic" does not require any particular timeframe, order, or structure. Therefore actions may occur instantaneously and/or with some delay; they may occur serially and/or in parallel; and they may occur in continuous process and/or in a batch process.

In this respect, in some implementations of the above described method aspect of the present technology, (if the domain name is a member of the third set of domain names) the sending by the at least one server to the client device the at least one second IP address without the at least one server having received from the client device a request for at least one IP address associated with the domain name after the at least one server has sent to the client device the at least one first IP address, is carried out concurrently for a plurality of domain names, defining a concurrent update. Similarly, in some implementations of the above described system aspect of the present technology, the second dispatch name information component effects a concurrent sending for a plurality of domain names, defining a concurrent update. Similarly, in some implementations of the computer usable information storage medium aspect of the present technology, the computer readable program code further includes instructions that when executed by the computer effect a concurrent sending by the at least one server to the client device of the at least one second IP address without the at least one server having received from the client device a request for at least one IP address associated with the domain name after the at least one server has sent to the client device the at least one first IP address, for a plurality of domain names, defining a concurrent update. In some of such implementations, concurrent updates occur on a periodic basis. In some of such implementations, a concurrent update occurs only once the number of domain names in the plurality in respect of which an at least one second IP address has been obtained by the at least one server is not less than a predefined threshold number.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression "at least one server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (pictures, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present invention as well as other aspects and further features thereof, reference is made to the following description which is to be used in conjunction with the accompanying drawings, where:

FIG. 4A-4F are flow charts illustrating various methods being implementations of the present technology.

DETAILED DESCRIPTION

Figure 1:
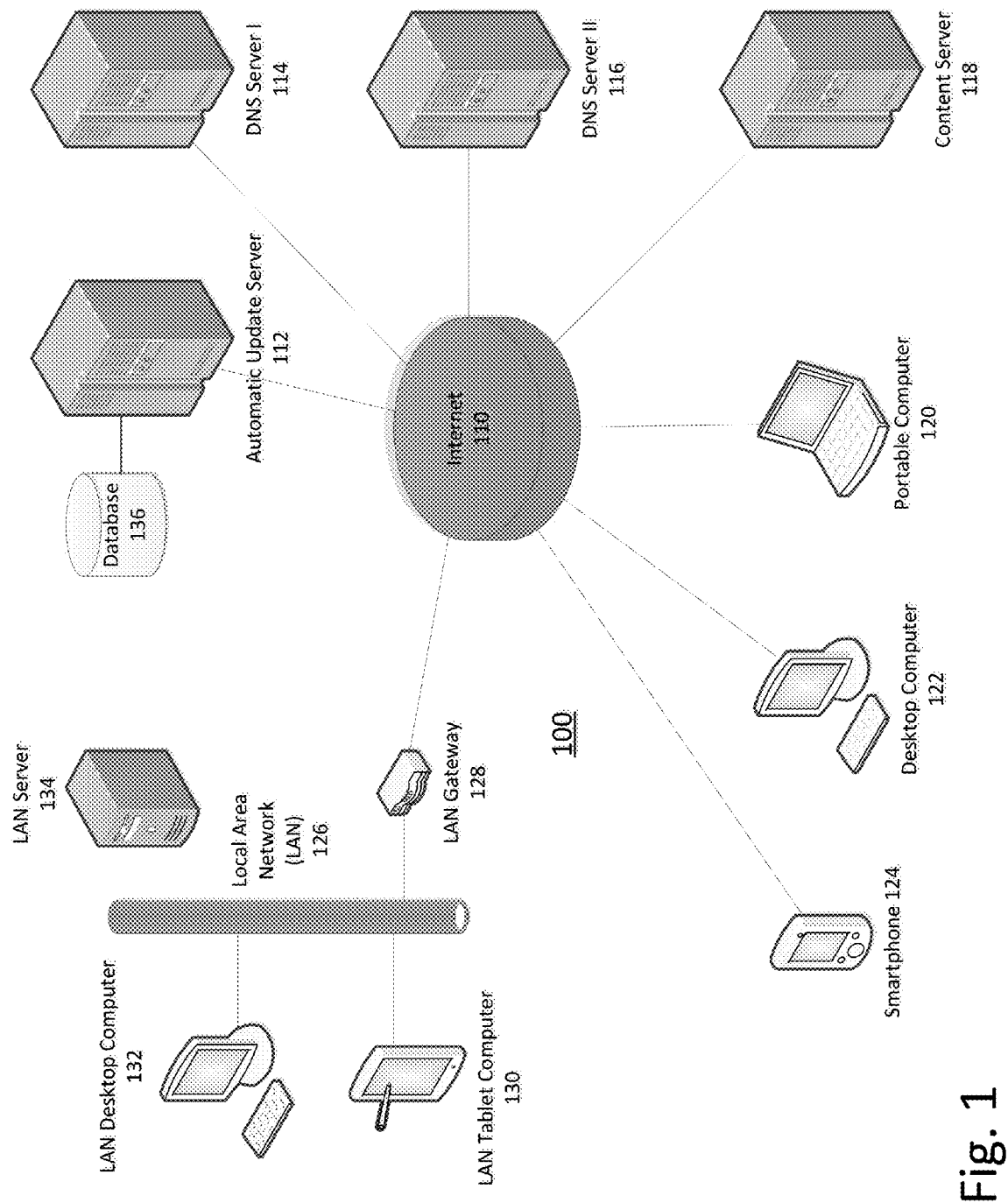
FIG. 1 is a schematic diagram showing a systems being an implementations of the present technology within a communications network environment.

Referring to FIG. 1, there is shown a diagram of various networked computer systems 100 in communication with one another via a communications network 110. It is to be expressly understood that the various computer systems 100 are merely some implementations of the present technology. Thus, the description thereof that follows is intended to be only a description of illustrative examples of the present technology. This description is not intended to define the scope or set forth the bounds of the present technology. In some cases, what are believed to be helpful examples of modifications to computer systems 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the computer systems 100 may provide in certain instances simple implementations of the present technology, and that where such is the case they have been presented in this manner as an aid to understanding. As persons skilled in the art would understand, various implementations of the present technology may be of a greater complexity.

Referring to FIG. 1, computer systems 100 include a plurality of devices in communication with each other via a communications network 110. In the present implementation, communications network 110 is the Internet (and has been labeled as such in the figure), but in other implementations it could be any communications network capable of routing information between devices on the basis of their IP addresses. Computer systems 100 include various types of computer hardware and software, each of which will be described in turn.

Portable computer 120 in this implementation is a conventional notebook computer running the Microsoft™ Windows™ operating system and having the Yandex.Browser™ web browser program loaded and running thereon. (In other implementations, portable computer could be other types of hardware (e.g. notebook computers, laptop computers, tablet computers, netbook computers, etc.) and/or could be running other operating systems (e.g. Linux™, Mac OS X™, etc.) and/or other programs.) Portable computer 120 is connected to the Internet 110 in a conventional manner over a wireless communications link. (In other implementations, portable computer 120 could be connected to the Internet 110 over a conventional wired link (e.g. Ethernet).) Yandex.Browser is configured with the FastDNS™ extension (described below) in order to enable the portable computer 120 when running Yandex.Browser to act as a client device in respect of the present technology (described below). As would be understood by one skilled in the art, portable computer 120 has been assigned an IP address via the dynamic host configuration protocol (DHCP) from an Internet service provider providing portable computer 120 with its connection to the Internet 110. As part of the DHCP configuration process, in this implementation portable computer 120 is provided with IP addresses of two different domain name servers (DNS Server I 114 and DNS Server II 116) that the portable computer 120 can use to resolve domain names. Domain name servers 114, 116 are described in further detail hereinbelow. (It should be understood that the use of DHCP is not required by the present technology, and in other implementations, portable computer 120 could obtain its IP address and those of a DNS server(s) in another manner (e.g. manual entry).)

Desktop computer 122 in this implementation is a conventional desktop computer running the Apple™ Macintosh™ operating system, and having the Yandex.Browser web browser program loaded and running thereon. Desktop computer 122 is connected to the Internet 110 in a conventional manner over a wired communications link. Yandex.Browser is configured with the FastDNS™ extension (described below) described below in order to enable desktop computer 122 when running Yandex.Browser to act as a client device in respect of the present technology (described below). As was the case with portable computer 120, in other implementations, the hardware and/or software aspects of desktop computer 122 may vary in a similar fashion.

Smartphone 124 in this implementation is a conventional Samsung™ Galaxy™ SIII smartphone running the Google Android™ operating system, and having the Mozilla™ Firefox™ browser application loaded and running thereon. Smartphone 124 is connected to the Internet 110 in a conventional manner over a mobile network. In other implementations, smartphone 124 could be connected to the Internet in another manner such as wirelessly via Bluetooth™ or WiFi™. The Firefox browser application is configured with the FastDNS™ extension (described below) in order to enable the smartphone 124 when running Firefox browser to act as a client device in respect of the present technology (described below). As was the case with portable computer 120 and desktop computer 122, in other implementations the hardware and/or software aspects of smartphone 124 will vary. No particular smartphone hardware or software is required in respect of the present technology.

Local Area Network (LAN) server 134 in this implementation is a conventional computer server (e.g. a Dell™ PowerEdge™ Server) running the Microsoft™ Windows Server™ operating system. In other implementations LAN server 134 the hardware and/or software aspects of LAN server 134 will vary. LAN Server 134 is connected to a LAN 126 via a wired communications link (e.g. Ethernet). LAN Server 134 is running a FastDNS™ client application that allows LAN Server 134 to act as a client device in respect of the present technology (described below). Also connected to LAN 126 is a conventional desktop computer 132 running the Linux™ operating system and having the Mozilla Firefox web browser program loaded and running thereon. LAN desktop computer 132 is connected to LAN 126 via a conventional wired communications link. (The hardware and/or software aspects of LAN desktop computer 132 could vary similar to desktop computer 122. For that reason, various other implementations of LAN desktop computer 132 will not be described herein.) Also connected to LAN 126 is an Apple™ iPad™ tablet computer 130 running the Apple iOS™ operating system and having the Apple™ Safari web browser application loaded and running therein. LAN tablet computer 130 is connected to LAN 126 via a conventional wireless communications link. In other implementations, the hardware and/or software aspects of LAN tablet computer 130 will vary. Also connected to LAN 126 is a conventional LAN gateway 128 that connects the LAN 126 to the Internet 110 via a wired communications network. The function of LAN gateway 126 is to regulate communication between the various devices on the LAN 126 and devices in communication with the Internet 110 (not on the LAN). In this implementation, for example, LAN gateway 126 employs the DHCP and network address translation (NAT) to assign IP addresses to LAN devices (e.g. LAN Server 134, LAN desktop computer 132, LAN tablet computer 130, etc.) to allow them to communicate with Internet devices (e.g. content server 118).

DNS Server I 114 and DNS Server II 116 are each conventional DNS servers (providing conventional domain name resolution services as described in RFC 1035) in communication with the Internet 110. In the present implementation, DNS Servers I & II 114 and 116 have not been modified in any way as a result of the deployment of the present technology. In other implementations, as described above, this will not be the case. As would be understood by a person skilled in the art, each DNS Server has its own IP address.

Content server 118 is a conventional content server in communication with the Internet 110. As an example, in this implementation, content server is a web page publishing server publishing the home web page of the domain name company.yandex.com. In other implementations content server 118 could be any network resource identified by a domain name from which a client device could request information (being a web page or otherwise). In most implementations of the present technology, there are many (e.g. the Internet—billions) such content servers connected to communications network 110. Content server 118 merely serves to represent one such server for the purpose of illustrating a context within which the present technology can be made to usefully operate.

Automatic update server 112 is a conventional computer server is a conventional computer server (e.g. a Dell™ PowerEdge™ Server) running the Microsoft™ Windows Server™ operating system. In this implementation automatic update server 112 is a single server; in other implementations, the functionality of automatic update server is implemented via multiple servers. Loaded and running on the automatic update server 112 is a FastDNSTM server application program enabling the automatic update server 112 to function as a "server" in respect of the present technology. In this implementation, also loaded and running on automatic update server 112 is, conventional database management software that manages a database 136 to be used in conjunction with the present technology. In other implementations, database 136 is hosted on a different server from automatic update server 112, but in communication therewith. In some such implementations, such other server is a virtual server running on the same hardware as automatic update server 112, in other implementations such other server is running on hardware physically distinct from automatic update server 112. In the present implementation, database 136 is a software component which provides the service of storing address records in a hash table in the random access memory of automatic update server 112 and later recalling the information contained in those records. In other implementations, database 136 could store address records in a different type of volatile or non-volatile storage medium.

Figure 2:
FIG. 2 is a schematic diagram showing a component of a system implementing the present technology.

As was discussed above, in this implementation, running on automatic update server 112 is an application program, "FastDNS Server". In this implementation FastDNS Server, when running on automatic update server 112, enables automatic update server 112 to function as a "server" in respect of the present technology as such is described herein. In this implementation FastDNS Server is written in the C++ programming language, although such is not required by the present technology. Any programming language appropriate to the operating system running on the automatic update server 112 could be used in another implementation. Referring to FIG. 2, the FastDNS server program includes several components, the important ones of which will be discussed in turn. Such components include a set definitions component 138, a domain name information retrieval component 140 and a domain name information dispatch component 142.

Figure 3:
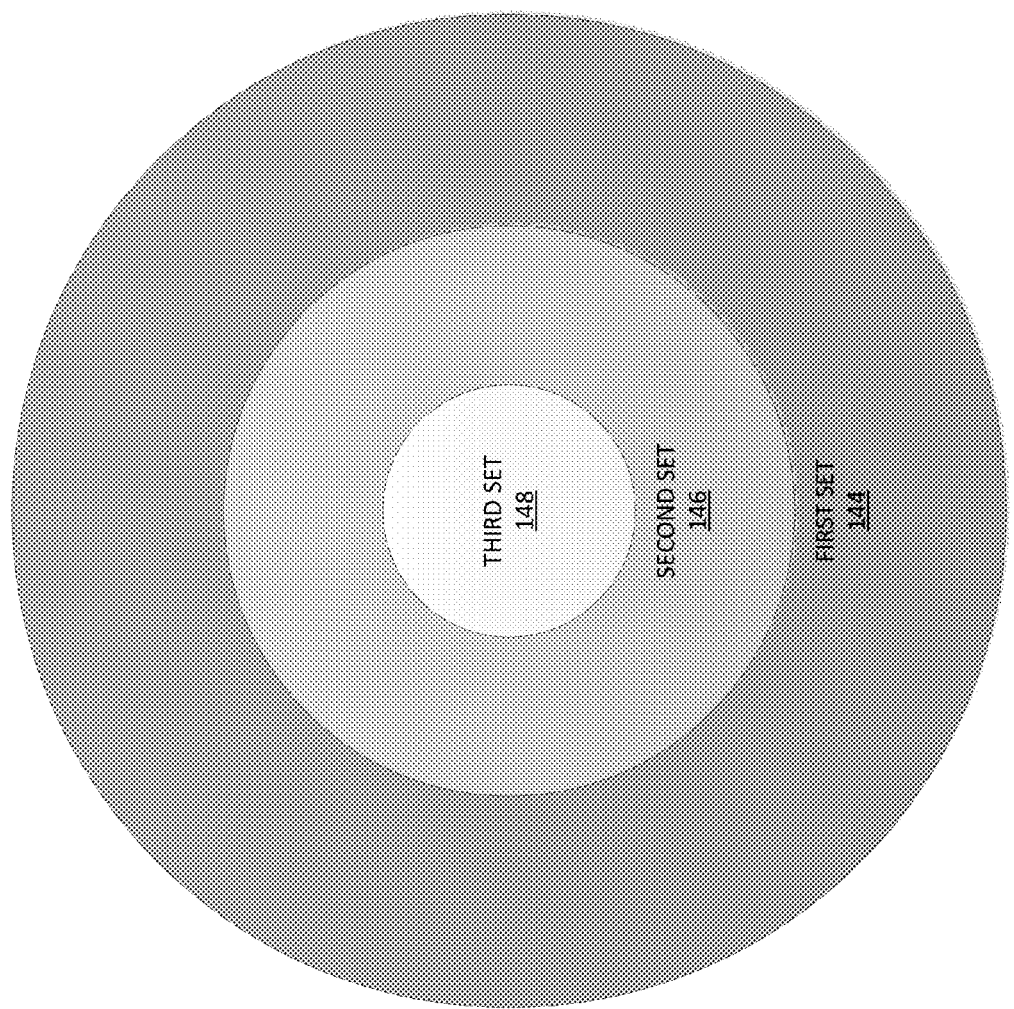
FIG. 3 is a schematic diagram showing various sets of the present technology.

The set definitions component 138 has several functions, including enabling the definitions of the various sets referred to herein. In this respect, in this implementation, which is used for purposes of illustration, referring to FIG. 3, there are three sets of domain names, a first set 144, a second set 146, and a third set 148. The first set 144 is defined as those domain names resolvable by a DNS Server I 114 (i.e. those domain names in respect of which DNS Server I 114 will itself directly resolve without having to make a request to another domain name server; it being understood that DNS Server I 114 is not an Internet Root Server). The members of first set 144 may change over time depending on which domain names are resolvable by DNS Server I 114 (although it is anticipated that the members of first set 144 will change relatively slowly). The second set 146 is defined as the 10,000 most frequently requested domain names of the domain names of the first set in the then past 24 hours. In this respect the members of the second set 146 will change over time, and that likely more frequently than the members of the first set 144. The information as to which domain names are the 10,000 most frequently requested domain names at any given point in time will obtained from an Internet search engine (e.g. the Yandex search engine). In this implementation (as discussed herein), the IP addresses of those domain names being members of the second set 146 are obtained and stored in database 136 associated with automatic update server 112. The third set 148 is defined as those domains whose IP addresses change less frequently than once per 1 hour, which in this implementation is represented by an IP address having a time-to-live value of greater than 3,600 seconds. The members of the third set 148, will likely change over time. In this implementation, the members of the third set 148 are dynamically determined by the automatic update server 112 as it resolves domain names of the second set 146 (as is discussed in further detail below). In this implementation, membership in the first set 144, the second set 146, and the third set 148 is independent of client device.

Returning back to a discussion of set definitions component 138, set definitions component 138 is constructed and configured to receive instructions as to the actual definitions of the sets to be used at any given time, and to make the definitions available to the other components of the FastDNS Server application that may require them. No software particularities (e.g. input method) are required by the present technology, however, to carry out these functions, any software capable of carrying out these functions will suffice. As an example, in one implementation, set definitions component 138 is configured to provide an operator, via a graphical user interface on a display associated with automatic update server 112, with various windows allowing the operator to input their instructions with respect to the definitions of the sets 144, 146, 148. The actual definitions are stored in database 136.

The domain name information retrieval component 140 has several functions, the first of which is to, using the definitions of the various sets 144, 146, 148 established via the set definitions component 138, determine the membership of the various sets 144, 146, 148 as is required and/or appropriate. Thus, in this implementation, domain name information retrieval component 140 communicates with DNS Server I 114 and with the Yandex search engine and periodically determines which domain names are members of the first set 144 (as the first set 144 is defined in respect of the present implementation—via information from DNS Server I 114) and of those, which domain names are members of the second set 146 (as the second set 146 is defined in respect of the present implementation—via information from the Yandex search engine). With respect to the determination of the membership of the first set 144, in this implementation this determination is made once per day (e.g. once per day the domain name information retrieval component 140 causes automatic update server 112 to request information from the DNS Server I 114 as to which domain names the DNS Server I 114 is capable of resolving). With respect to the determination of the membership of the second set 146, in this implementation this determination is made once per hour. (E.g. once per hour the domain name information retrieval component 140 causes the automatic update server 112 to request from the Yandex search engine the domain names having been most frequently requested in the then past 24 hours. The domain name information retrieval component 140 then causes a determination of whether each of the domain names having been received from the Yandex search engine as a result of the request is a member of the first set 144. The domain name information retrieval component 140 may cause additional requests to be made of the Yandex search engine, in order to have 100 domain names which are members of the first set complete the second set. i.e. it is possible that within the top 100 domain names having been most frequently requested via the Yandex search engine that some are not members of the first set 144 and therefore, for example, the top 150 such domain names will need to be requested from the Yandex search engine in order to have 100 of which that are members of the first set 144.) The domain name information retrieval component 140 causes information regarding the domain names being members of the first set 144 and domain names being members of the second set 146 to be stored in the database 136.

Once the membership of the first set 144 and the second set 146 has been established, an additional function of the domain name information retrieval component 140 is to cause automatic update server 112 to make a standard DNS resolution request to DNS Server I 114 to resolve a domain name for each of the domain names being members of the second set 146. DNS Server I 114 will respond to each such request of the automatic update server 112 with at least one (and in some cases more than one) IP address associated with the domain name of the second set 146 for which resolution has been requested, as well as with a time-to-live (TTL) value. As was discussed herein, the TTL value indicates for how long the address having been provided by DNS Server I 114 is valid. Domain name information retrieval component 140 will cause the information received from DNS Server I 114 to be stored in database 136. Once a TTL value associated within an IP address indicates that that IP address is no longer valid, domain name information retrieval component 140 will cause a determination to be made as to whether the domain name with which that IP address is associated is still a member of the second set 146 and, if so, will cause a new standard DNS resolution request in respect of that domain name to be made by automatic update server 112 to DNS Server I 114. Domain name information retrieval component 140 will cause the information received from DNS Server I 114 to be stored in database 136.

Domain name information retrieval component 140 also implements a comparator functionality with respect TTL values, in order to determine which of the domain names (being members of the second set 146) are members of the third set 148. As was noted above, in this implementation, in order for a domain name of the second set 146 to be a member of the third set 148, the IP address of that domain must have a TTL of at least 60 minutes. The domain name information retrieval component 140 causes a determination of whether this is the case each time a DNS domain name resolution request response is received. If the TTL value of a domain name is greater than this threshold value, then an indication that that domain name is a member of the third set 148 is stored in the database 136.

The domain name information dispatch component 142 includes the functions of receiving information from a client device that information should be sent to that client device and sending information to that client device. Thus, in the present implementation, when a client device utilizing the present technology accesses the system, as is described in greater detail below, it will send a message to automatic update server 112 notifying automatic update server 112. One function of domain name information dispatch component 142 is to receive such messages from client device and to store appropriate information about the client device (e.g. its IP address) in the database 136. An additional function of domain name information dispatch component 142 is to periodically send to client devices domain name resolution information (e.g. a domain name and its associated IP address(es)) for storage on such client devices. In this implementation, the periodicity with which this occurs (e.g. every 15 minutes) is set via the set definitions component 138 by the operator and is independent of any particular client device. Also in this implementation, the information is sent as a batch update containing only changes that have occurred since the previous update has been sent. In other implementations, the periodicity with which this occurs may be set by the client device. In other implementations, the information may be sent in a continuous fashion, whenever updated information has been received by the automatic update server 112. In various implementations, updates may be sent as unicast messages to specific individual client devices or may be sent as broadcast messages to groups of client devices.

Turning to the client device, in one implementation, as was described hereinabove, the present technology is implemented via a browser extension termed "FastDNS Extension™". As a browser extension, FastDNS Extension will be implemented with respect to different Internet web browsers and with respect to different operating systems differently, in a manner appropriate to the web browser/operating system in question.

When installed and activated, in one implementation a version of the FastDNS Extension implements the following functionality. A client device sends a message to an automatic update server 112 (running the FastDNS Server program application) indicating the client device's presence on the communications network (e.g. Internet 110). The message contains information needed by the automatic update server 112 (e.g. the IP address of the client device), which will vary depending on the implementation of the present technology. (E.g. to the extent that the set definitions will vary based on information received from a client device, the client device in question needs to send that information to the automatic update server 112). The automatic update server 112 will send to the client device an initial sending consisting of the domain names (and their associated IP addresses) of the third set 148 of domain names. The FastDNS Extension causes the information received from the automatic update server 112 to be stored in a local cache file associated with that browser. As additional updates are (automatically periodically) received from the automatic update server 112, the FastDNS Extension causes the information stored in the cache file to be updated with the updated information. When resolution of a domain name is required by the browser, the request is not sent to a DNS server in the usual manner. Instead, the FastDNS Extension causes a lookup in the browser cache to determine whether an IP address in respect of that domain name is contained in the cache. If there is such an IP address in the cache, then the FastDNS Extension causes the browser to use that IP address in making a request of the host at that IP address for information. If there is not such IP address, in this implementation, the FastDNS Extension causes a standard DNS request to be made in respect of the domain name in question to a DNS Server (e.g. DNS server I 114).

In another alternative implementation, however if there is not such IP address in the browser cache, the FastDNS Extension causes a request to be made to the automatic update server 112 for such an IP address. If the automatic update server 112 returns an IP address in respect of the request from the client device, the FastDNS Extension causes the browser to use that IP address in making a request of the host at that IP address for information. If the automatic update server 112 does not return an IP address in respect of the request from the client device, then the FastDNS Extension causes (or allows—as the case may be) a standard DNS request to be made in respect of the domain name in question to a DNS Server (e.g. DNS server I 114).

Figure 4A:
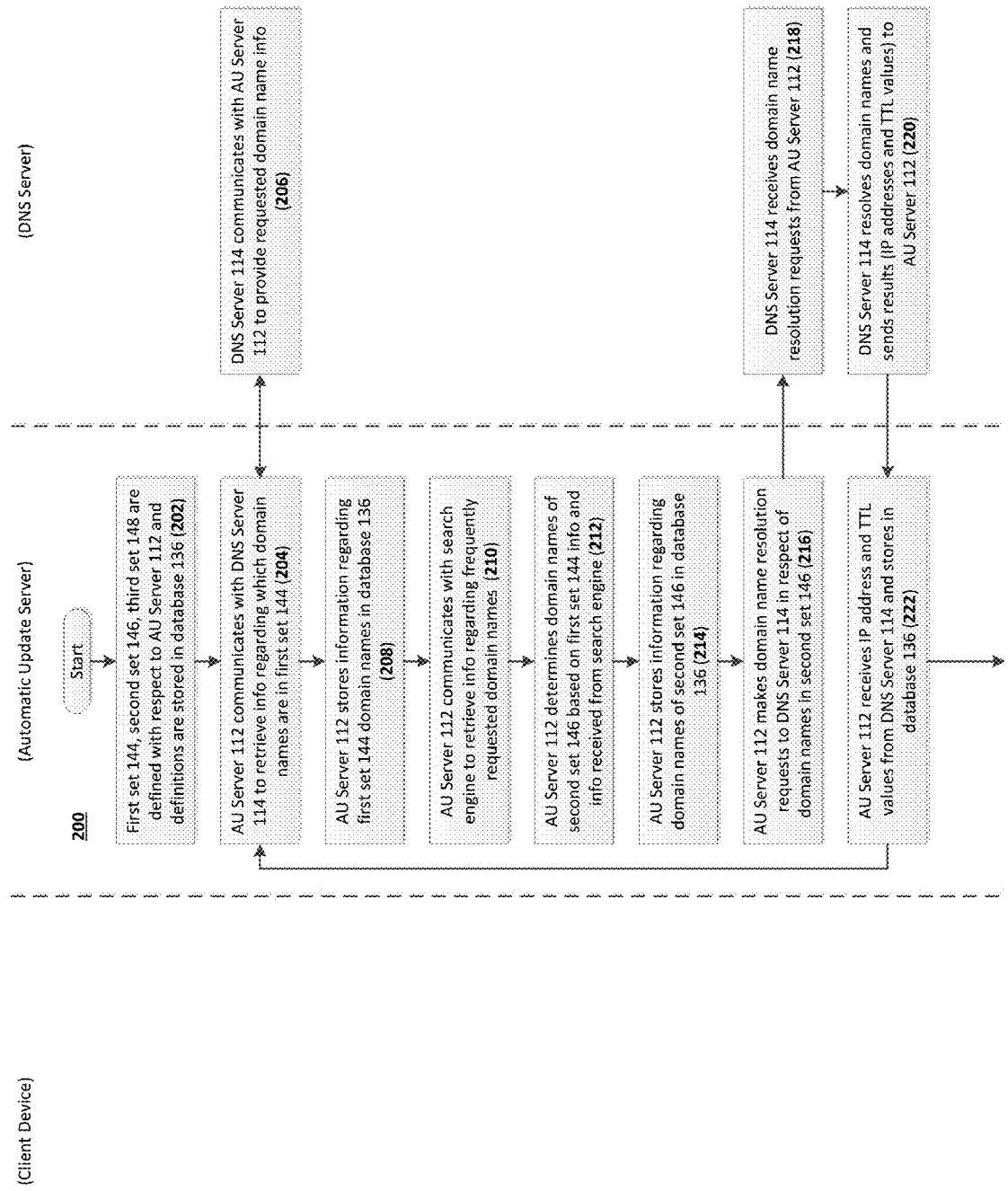
Figure 4B:
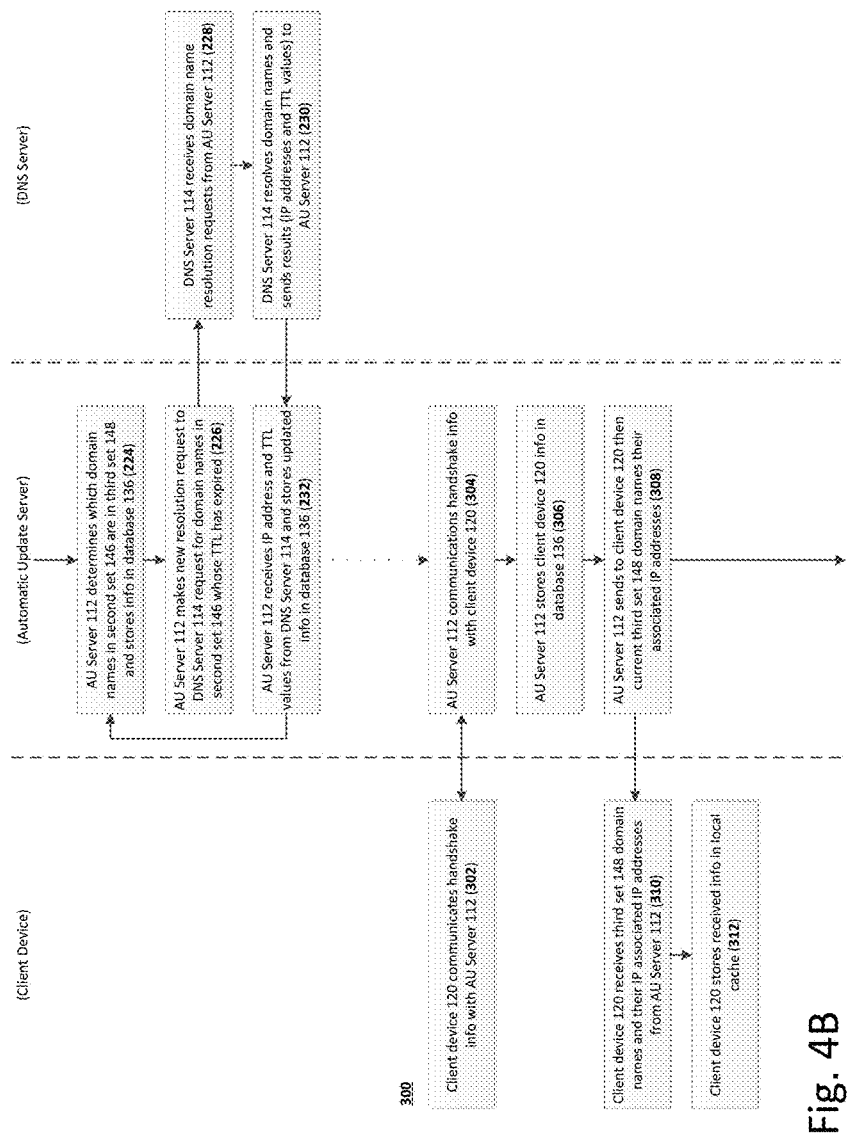

Shown in FIGS. 4A-4F is a flow chart illustrating implementations of the present technology. In FIGS. 4A & 4B, there is shown a flow chart illustrating, in one implementation, a method 200 with respect to automatic update server 112 (referred to herein) whereby automatic update server 112, amongst other things, maintains up-to-date addresses for domain names of the second set 146 (referred to above) and determines which of those domain names are in the third set 148 (referred to above).

At 202, definitions of the first set 144, the second set 146, and the third set 148 are provided to the automatic update (AU) server 112, via operator interaction with the set definitions component 138 of the FastDNS application program running on the automatic update server 112. Once the various sets 144, 146, 148, have been defined, at 204 & 206 automatic update server 112 communicates with DNS Server I 114, to determine which domain names DNS Server I 114 is capable of directly resolving. These domain names form the first set 144 of the domain names. At 208, information regarding these domain names is stored in the database 136 in communication with the automatic update server 112.

At 210, automatic update server 112 communications with a search engine (e.g. the Yandex™ search engine) to be provided with the most frequently requested domain names (as determined by user selection in search results) of the domain names of the first set 144 in the then past 24 hours. At 212, automatic update server 112 then determines which of those domain names (provided by the Yandex search engine) are within the first set 144. When automatic update server 112 has determined the top 10,000 of such domain names falling within the first set 144, those domain names are the then current members of the second set 146 (in this implementation). At 214, information regarding the domain names of the second set 146 is stored in the database 136 in communication with the automatic update server 112. At 216, for each of domain name of the second set 146 of domain names, automatic update server 112 makes a conventional domain name resolution request to DNS Server I 114. At 218, DNS Server I 114 receives such resolution requests, and at 220, DNS Server I 114 resolves such domain names and sends back to automatic update server 112 conventional domain name resolution results (including an IP address and a time-to-live (TTL) value). At 222, automatic update server 112 stores the domain name resolution results (including the IP address and the TTL value) received from DNS Server I 114 in the database 136 in communication with the automatic update server 112. Automatic update server 112 periodically communicates with DNS Server I 114 to update the list of domain names that DNS Server 114 is then capable of directly resolving. As changes are made to that list, and thus to first set 144, the process described hereinabove is repeated to determine the domain names of the second set 146. This repetition is shown in FIG. 4A by the arrow looping back to action 204 from action 222.

At 224, automatic update server 112 determines which of the domain names of the second set 146 are within the third set 148 (which, as was discussed hereinabove, are those domain names of the second set 146 having a received TTL value of greater than 3600 seconds). Information regarding those domain names that are in the third set 148 is stored in the database 136 in communication with the automatic update server 112.

At 226, automatic update server 112, automatically reviews resolved domain names' TTL values. When a resolved domain name goes stale ("expires") as it has passed its time-to-live value, at 226, automatic update server 112 makes a new conventional domain name resolution request to DNS Server I 114 in respect of that domain name. At 228, DNS Server I 114 receives such resolution request, and at 230, DNS Server I 114 resolves such domain names and sends back to automatic update server 112 a conventional domain name resolution result (including an IP address and a time-to-live (TTL) value). At 232, automatic update server 112 receives and stores the domain name resolution results (including the IP address and the TTL value) received from DNS Server I 114 in the database 136 in communication with the automatic update server 112. The process then returns to action 224 to determine whether that domain name remains (based on its newly received TTL value) is still in the third set 148. Information in this respect is then stored in the database 136 in communication with the automatic update server 112.

In FIGS. 4B & 4C, there is shown a flow chart illustrating, in one implementation, a method 300 with respect to a client device (for example, portable computer 120, desktop computer 122, smartphone 124 or LAN Server 134—hereinafter referred to for simplicity as client device 120) automatically receiving up-to-date IP addresses from automatic update server 112. At 302, client device 120 communicates handshake information with automatic update server 112. This occurs, in the present embodiment, when the Yandex.Browser with FastDNS Extension (referred to above) is running on the client device 120 when connected to the Internet. At 304, automatic update server 112 receives the handshake information from the client device 120 and returns back an acknowledgement that the information sent by the client device 120 has been received by the automatic update server 112. At 306, automatic update server 112 stores information regarding the client device 120 (e.g. its IP address) in the database 136 in communication with the automatic update server 112.

Once the handshake has been completed, at 308, automatic update server 112 sends to the client device 120 information respecting each of the domain names of the third set 148 along with its IP address then currently stored in the database 136 in communication with the automatic update server 112. At 310, client device 120 receives such information from the automatic update server 112 and, at 312, stores such information in a local browser cache (in this implementation) on the client device 120.

As shown at 314, automatic update server 112 is continuously checking for changes in the information respecting the third set 148 of domains (e.g. which domain names are members and what is the then current IP address for such domain names). Such changes will occur as the first set 144 information and the second set 146 information are updated (as is described above). At 316, as information respecting the third set 148 of domain names is changed, automatic update server 112 sends such updated information to the client device. At 318, client device 120 receives such updated information from the automatic update server 112, and at 320, stores such information in the local browser cache on the client device 120.

Also in FIG. 4C, there is shown a flow chart illustrating, in one implementation, a method 400 where the client device uses IP address information stored in the local browser cache to contact a content server 118. At 402, client device 120 receives a request from a user for resolution of a domain name within the third set 148. As an example, such a domain name may be the domain name for the home web page published by content server 118 having been entered into the address bar of the Yandex.Brower web browser. At 404, the FastDNS Extension determines that that domain name and its associated IP address are stored in the local browser cache and retrieves the stored IP address. At 406, FastDNS uses the retrieved IP address for the content server 118 to initiate contact with the content server 118. Thus client device 120 need make no call to a DNS server in this instance to contact content server 118.

Figure 4D:
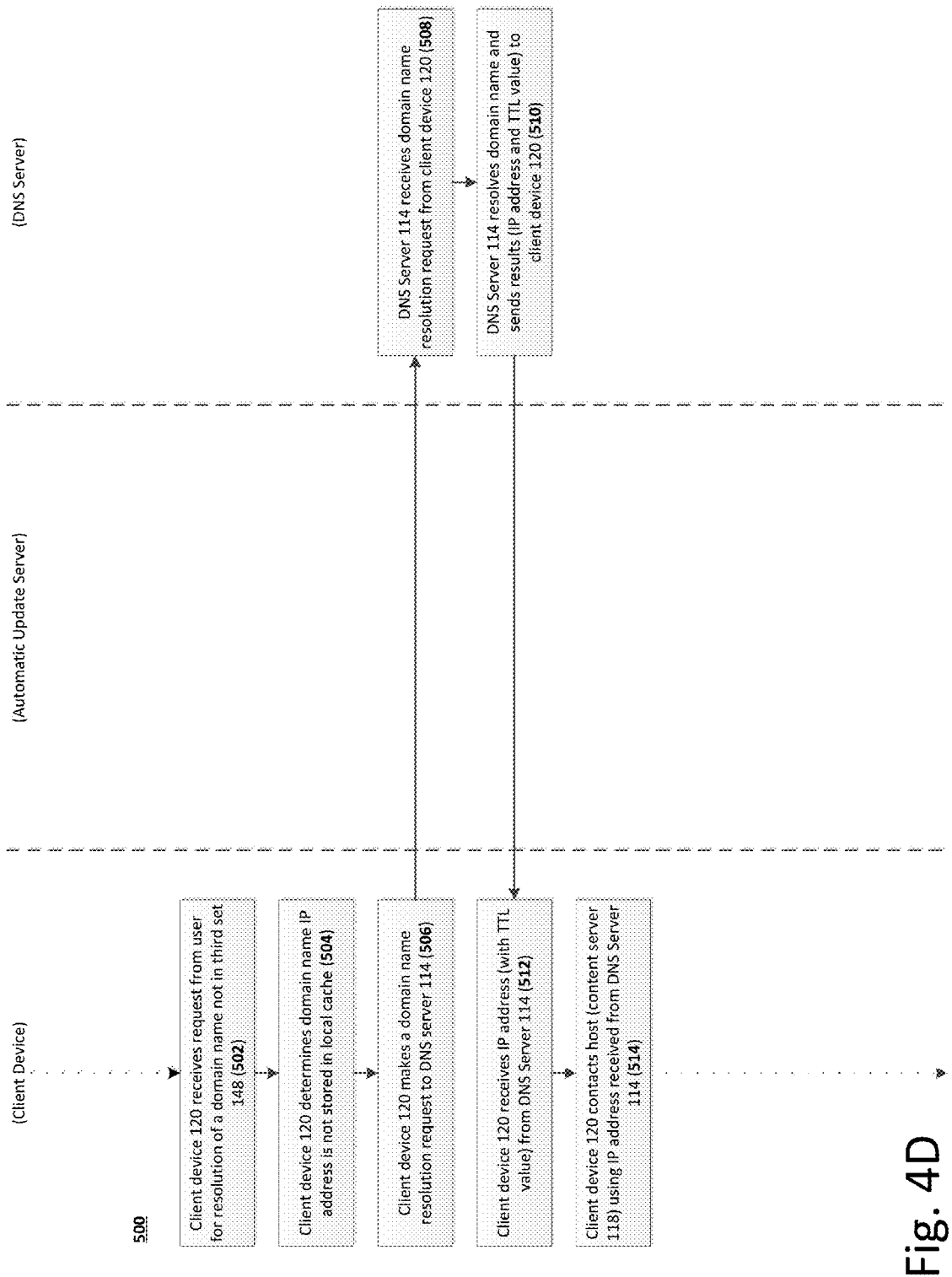

In FIG. 4D, there is shown a flow chart illustrating, in one implementation, a method 500 where the client device 120 does not use IP information stored in the local cache to contact a content server 118. At 502, client device 120 receives a request from a user for resolution of a domain name not within the third set 148. (Continuing with the previous example, the domain name could be the home web page published by content server 118.) At 504, the FastDNS Extension determines that that domain name and its associated IP address are not stored in the local browser cache. Thus, at 506, the FastDNS Extension causes client device 120 to make a conventional DNS request to DNS Server I 114 to resolve the domain name. At 508, DNS Server I 114 receives the request, and, at 510, DNS Server I 114 resolves the request and sends the results (including the IP address and a TTL value) to the client device 120. At 512, the client device 120 receives the IP address and the TTL value from DNS Server I 114. At 514, the client device 120 contacts the content server 118 using the IP address having been received from DNS Server I 114.

Figure 4F:
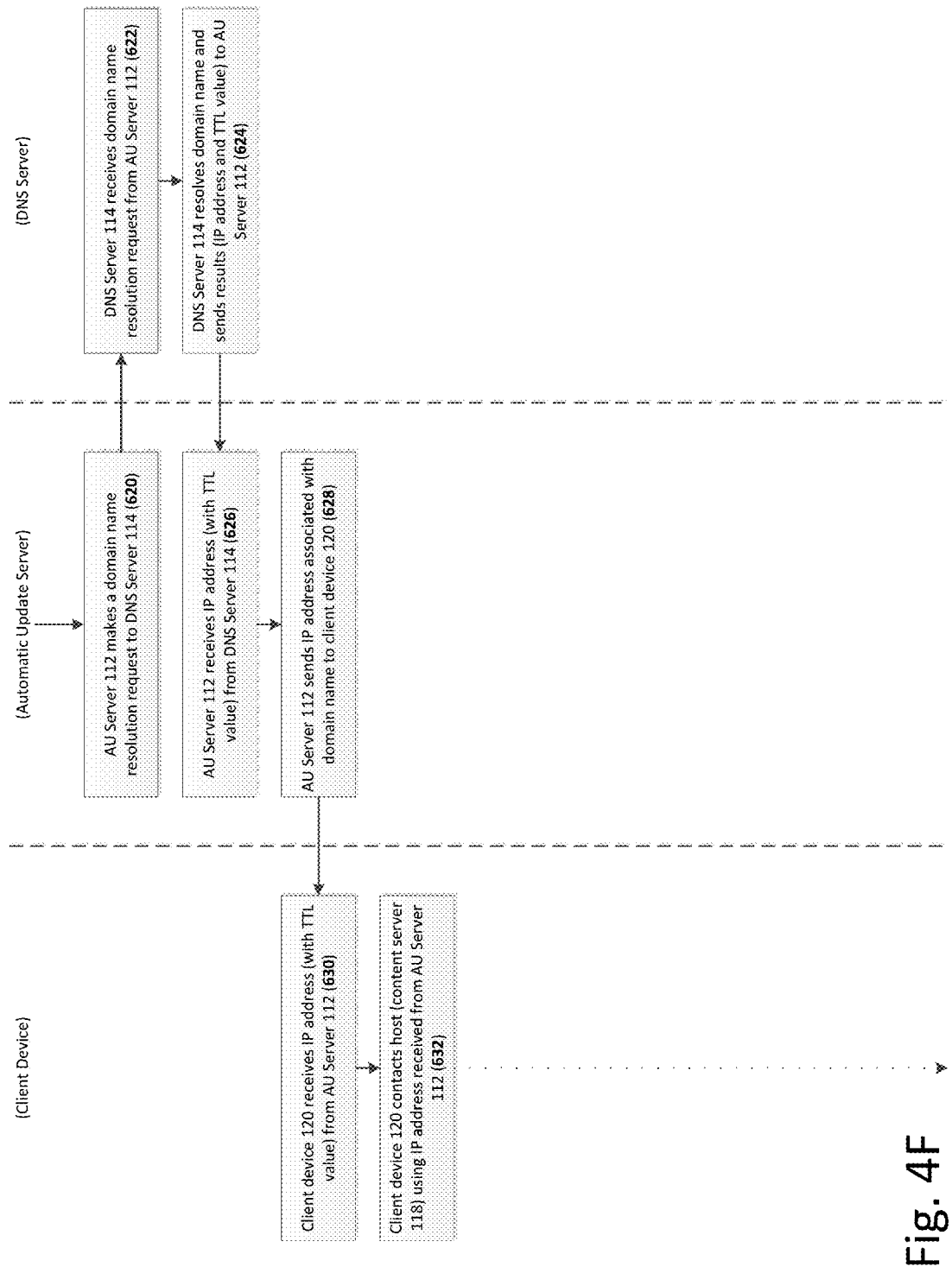

In FIGS. 4E & 4F, there is shown a flow chart illustrating, in another implementation, a method 600 where the client device does not use information stored in the local cache to contact a content server 118. At 602, client device 120 receives a request from a user for resolution of a domain name not within the third set 148. (Continuing with the previous example, the domain name could be the home web page published by content server 118.) At 604, the FastDNS Extension determines that that domain name and its associated IP address are not stored in the local browser cache. Thus, at 606, the FastDNS Extension contacts the automated update server 112 to determine whether the IP address for that domain is stored in the database 136 in communication with the automatic update server (an unconventional "resolution" request). At 608, the automatic update server 112 receives the request from the client device 120, and determines, at 610, whether the domain name in question is a member of the second set 146 (and thus whether its associated IP address is stored within the database 136 in communication with the automatic update server 112). If the domain name in question is a member of the second set 146, then at 612, the automatic update server retrieves the IP address associated with that domain name from the database 136, and, at 614, forwards the IP address (with its associated TTL value) to the client device 120. At 616, the client device 120 receives the IP address (and associated TTL value) from the automatic update server 112, and at 618, the client device 120 contacts the content server 118 using the IP address having been received from the automatic update server 112. If, however, the domain name in question is not a member of the second set 146, then at 620, the automatic update server 112 makes a conventional DNS resolution request in respect of that domain name to DNS Server I 114. At 622, DNS Server I 114 receives the resolution request from the automatic update server 112, and at 624, DNS Server 114 resolves the domain name and forwards the domain name resolution information (including the IP address and a TTL value) to the automatic update server 112. At 626, the automatic update server 112 receives the domain name resolution information from DNS Server I 114 (and may optionally store such information in the database 136). At 628, the automatic update server 112 forwards the received domain name resolution information to the client device 120. At 630, the client device receives the domain name resolution information (including the IP address and the TTL value). At 632, the client device 120 contacts the content server 118 using the IP address having been received from the DNS Server I 114 via the automatic update server 112.

It should be understood that the foregoing flow charts are only meant to show simplified examples of implementations of the present technology. Various actions have been omitted in order to facilitate understanding.

As a non-limiting example, the communications between the client device 120 and the automatic update server 112 referred to above may take place as a series of messages back and forth (via TCP/IP) between the client device 120 and the automatic update server 112.

As was discussed above, a first such message may be termed a handshake message. Thus, after a TCP/IP connection between the client device 120 and the automatic update server 112 is established, in one implementation, the automatic update server 112 awaits receipt from the client of a BSRV_OPEN message (a sample message is shown below). Once the BSRV_OPEN message has been received and validated, the automatic update server 112 responds back to the client with a similar message.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       message length = 10                     |
+-+-+-+-+-+-+-+-+-+-+-+-+-+-+-+-+-+-+-+-+-+-+-+-+-+-+-+-+-+-+-+-+
|          code = BSRV_OPEN         |         reserved (pad)    |
+-+-+-+-+-+-+-+-+-+-+-+-+-+-+-+-+-+-+-+-+-+-+-+-+-+-+-+-+-+-+-+-+
|             version = 1           |      signature = 0xB0BAU  |
+-+-+-+-+-+-+-+-+-+-+-+-+-+-+-+-+-+-+-+-+-+-+-+-+-+-+-+-+-+-+-+-+
```

Depending on the implementation, a client device 120 employing the present technology may send to the automatic update server 112 a list of domain names in respect of which the client should be provided automatic updates (i.e. in such implementations the client device, at least part, defines the third set 148 of domain names). An example of such a message from the client device to the automatic update server is the BSRV_TOSRV_ADDHOSTS message below (wherein FQDN="Fully Qualified Domain Name").

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       message length                          |
+-+-+-+-+-+-+-+-+-+-+-+-+-+-+-+-+-+-+-+-+-+-+-+-+-+-+-+-+-+-+-+-+
|   code =                          |                           |
|   BSR_TOSRV_ADDHOSTS              |      reserved (pad)       |
+-+-+-+-+-+-+-+-+-+-+-+-+-+-+-+-+-+-+-+-+-+-+-+-+-+-+-+-+-+-+-+-+
|        entries_count = n          |                           |
+-+-+-+-+-+-+-+-+-+-+-+-+-+-+-+-+-+-+                           |
|                                                               |
|                   FQDN [0]  (Pascal string)                   |
\                                                               \
\                                                               \
|                                                               |
|                   FQDN [n - 1]                                |
+-+-+-+-+-+-+-+-+-+-+-+-+-+-+-+-+-+-+-+-+-+-+-+-+-+-+-+-+-+-+-+-+
```

The automatic update server 112 may send to the client device 120 a list of domain names and corresponding IP address in the form of the message BSRV_TOBROWSER_DNS_CHANGED message below. Depending on the implementation, this message may be used for both an initial sending of the domain names and their associated IP addresses of the third set 148 and/or for subsequent updates.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       message length                          |
+-+-+-+-+-+-+-+-+-+-+-+-+-+-+-+-+-+-+-+-+-+-+-+-+-+-+-+-+-+-+-+-+
|   code                            |                           |
|   = BSRV_TOBROWSER_DNS_CHANGED    |      reserved (pad)       |
+-+-+-+-+-+-+-+-+-+-+-+-+-+-+-+-+-+-+-+-+-+-+-+-+-+-+-+-+-+-+-+-+
|       entries_count = n           |      reserved (pad)       |
+-+-+-+-+-+-+-+-+-+-+-+-+-+-+-+-+-+-+-+-+-+-+-+-+-+-+-+-+-+-+-+-+
|                         addr [0]                              |
\                                                               \
\                                                               \
|                         addr [n -1]                           |
+-+-+-+-+-+-+-+-+-+-+-+-+-+-+-+-+-+-+-+-+-+-+-+-+-+-+-+-+-+-+-+-+
|                                                               |
|                   FQDN (Pascal string)                        |
\                                                               \
\                                                               \
|                                                               |
+-+-+-+-+-+-+-+-+-+-+-+-+-+-+-+-+-+-+-+-+-+-+-+-+-+-+-+-+-+-+-+-+
```

The automatic update server 112 may send to the client device 120 a list of domain names having been removed from the third set 148 and thus which should be removed from the local browser cache in the form of the BSRV_TO-BROWSER_WITHDRAW_FQDN message below.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                       message length                          |
+-+-+-+-+-+-+-+-+-+-+-+-+-+-+-+-+-+-+-+-+-+-+-+-+-+-+-+-+-+-+-+-+
|   code =                          |                           |
|   BSRV_TOBROWSER_WITH-            |      reserved (pad)       |
|   DRAW_FQDN                       |                           |
+-+-+-+-+-+-+-+-+-+-+-+-+-+-+-+-+-+-+-+-+-+-+-+-+-+-+-+-+-+-+-+-+
|                                                               |
|                   FQDN   (Pascal string)                      |
\                                                               \
\                                                               \
|                                                               |
+-+-+-+-+-+-+-+-+-+-+-+-+-+-+-+-+-+-+-+-+-+-+-+-+-+-+-+-+-+-+-+-+
```

The automatic update server 112 may sent to the client device 120 an instruction to seek information from a different automatic update server in the form of the BSRV_TO-BROWSER_REDIRECT message below.

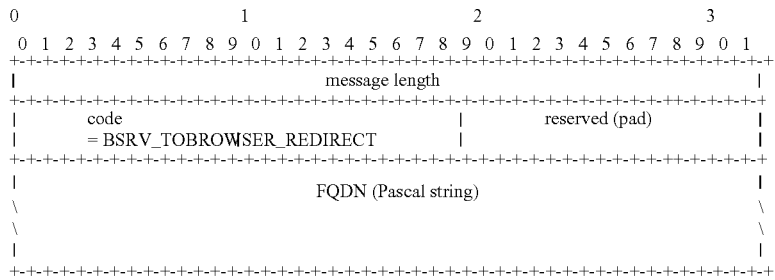

It should be understood that the above messages are intended only as examples for the purpose of facilitating understanding. In different implementations of the present technology, the communication between the client device 120 and automatic update server 112 could take place via any suitable means or format.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of providing a client device with an automatic update of at least one IP address associated with a domain name, by at least one server via a communications network, the method comprising:
   (a) if the domain name is a member of a second set of domain names, the second set being a subset of a first set of domain names,
      (i) obtaining by the at least one server from a first domain name resolution service at least one first IP address associated with the domain name, and
      (ii) storing by the at least one server in a database in communication with the at least one server at least one address record including the domain name and the at least one first IP address;
   (b) if the domain name is a member of a third set of domain names, the third set being a subset of the second set of domain names, sending to the client device by the at least one server the at least one first IP address;
   (c) if the domain name is a member of the second set of domain names, and if at least one second IP address associated with the domain name being different from the at least one first IP address is obtainable by the at least one server from a second domain name resolution service after the at least one server has obtained the at least one first IP address,
      (iii) obtaining by the at least one server from the second domain name resolution service the at least one second IP address, and
      (iv) storing by the at least one server in the database an address record including the domain name and the at least one second IP address; and
   (d) if the domain name is a member of the third set of domain names, sending by the at least one server to the client device the at least one second IP address without the at least one server having received from the client device a request for at least one IP address associated with the domain name after the at least one server has sent to the client device the at least one first IP address.

2. The method of claim 1, wherein (d) is carried out concurrently for a plurality of domain names, defining a concurrent update.

3. The method of claim 2, wherein concurrent updates occur on a periodic basis.

4. The method of claim 2, wherein a concurrent update occurs only once the number of domain names in the plurality in respect of which an at least one second IP address has been obtained by the at least one server is not less than a predefined threshold number.

5. The method of claim 1, wherein at least one of the first set of domain names, the second set of domain names, and the third set of domain names is defined, at least in part, based on a popularity of network resources.

6. The method of claim 1, wherein at least one of the first set of domain names, the second set of domain names, and the third set of domain names is defined, at least in part, based on geography.

7. The method of claim 1, wherein at least one of the first set of domain names, the second set of domain names, and the third set of domain names is defined, at least in part, based on language.

8. The method of claim 1, wherein at least one of the first set of domain names, the second set of domain names, and the third set of domain names is defined, at least in part, based on domain name hierarchy.

9. The method of claim 1, wherein at least one of the first set of domain names, the second set of domain names and the third set of domain names is defined, at least in part, based on search engine statistical information.

10. The method of claim 1, wherein at least one of the second set of domain names and the third set of domain names is defined, at least in part, based on freshness parameters.

11. The method of claim 1, wherein at least one of the second set of domain names and the third set of domain names is defined, at least in part, using a freshness parameter predetermined threshold value.

12. The method of claim 1, wherein at least one of the second set of domain names and the third set of domain names is defined, at least in part, based on information having been received from the client device.

13. The method of claim 1, wherein at least one of the second set of domain names and the third set of domain names is defined, at least in part, based on demographic information.

14. The method of claim 1, wherein at least one of the second set of domain names and the third set of domain names is defined, at least in part, based on estimated uses of IP addresses.

15. The method of claim 1, wherein at least one of the second set of domain names and the third set of domain names is defined, at least in part, based on properties of the client device.

16. The method of claim 1, wherein at least one of the second set of domain names and the third set of domain names is defined, at least in part, based on properties of the communications network.

17. The method of claim 1, wherein at least one of the second set of domain names and the third set of domain names is defined, at least in part, based on historical usage of the client device.

18. The method of claim 1, wherein the third set of domain names is defined, at least in part, based on a specific request of the client device.

19. The method of claim 1, wherein the third set of domain names is defined, at least in part, based on a user profile.

20. The method of claim 1, wherein the second set is a proper subset of the first set.

21. The method of claim 1, wherein the third set is a proper subset of the second set.

22. The method of claim 1, wherein the first domain name resolution service and the second domain name resolution service are a same domain name resolution service.

23. The method of claim 1, wherein at least one of the first domain name resolution service and the second domain name resolution service is a process running on the at least one server.

24. The method of claim 1, wherein at least one of the first domain name resolution service and the second domain name resolution service is in communication with the at least one server via the communications network.

25. A system for providing a client device with an automatic update of at least one IP address associated with a domain name, by at least one server via a communications network, the system comprising:
  (a) a first domain name information retrieval component that effects, if the domain name is a member of a second set of domain names, the second set being a subset of a first set of domain names,
    (i) obtaining by the at least one server from a first domain name resolution service of at least one first IP address associated with the domain name, and
    (ii) storing by the at least one server in a database in communication with the at least one server of at least one address record including the domain name and the at least one first IP address;
  (b) a first domain name information dispatch component that effects, if the domain name is a member of a third set of domain names, the third set being a subset of the second set of domain names, sending to the client device by the at least one server of the at least one first IP address;
  (c) a second domain name information retrieval component that effects, if the domain name is a member of the second set of domain names, and if at least one second IP address associated with the domain name being different from the at least one first IP address is obtainable by the at least one server from a second domain name resolution service after the at least one server has obtained the at least one first IP address,
    (iii) obtaining by the at least one server from the second domain name resolution service of the at least one second IP address, and
    (iv) storing by the at least one server in the database of an address record including the domain name and the at least one second IP address; and
  (d) a second domain name information dispatch component that effects, if the domain name is a member of the third set of domain names, sending by the at least one server to the client device of the at least one second IP address without the at least one server having received from the client device a request for at least one IP address associated with the domain name after the at least one server has sent to the client device the at least one first IP address.

26. A computer usable information storage medium having computer readable program code embodied thereon for providing a client device with an automatic update of at least one IP address associated with a domain name, by at least one server via a communications network, the computer readable program code including instructions that when executed by a computer effect:
  (a) if the domain name is a member of a second set of domain names, the second set being a subset of a first set of domain names,
    (i) obtaining by the at least one server from a first domain name resolution service of at least one first IP address associated with the domain name, and
    (ii) storing by the at least one server in a database in communication with the at least one server of at least one address record including the domain name and the at least one first IP address;
  (b) if the domain name is a member of a third set of domain names, the third set being a subset of the second set of domain names, sending to the client device by the at least one server of the at least one first IP address;
  (c) if the domain name is a member of the second set of domain names, and if at least one second IP address associated with the domain name being different from the at least one first IP address is obtainable by the at least one server from a second domain name resolution service after the at least one server has obtained the at least one first IP address,
    (iii) obtaining by the at least one server from the second domain name resolution service of the at least one second IP address, and
    (iv) storing by the at least one server in the database of an address record including the domain name and the at least one second IP address; and
  (d) if the domain name is a member of the third set of domain names, sending by the at least one server to the client device of the at least one second IP address without the at least one server having received from the client device a request for at least one IP address associated with the domain name after the at least one server has sent to the client device the at least one first IP address.

* * * * *